United States Patent [19]
Dubner

[11] Patent Number: 5,835,105
[45] Date of Patent: Nov. 10, 1998

[54] METHOD OF OPTICALLY TURNING A MAGNETO-OPTIC MEDIUM HAVING IN ORDER A SUBSTRATE TWO DIELECTRIC LAYERS, AND A THICK MAGNETO-OPTIC RECORDING LAYER, AND MEDIUM TURNER BY THAT METHOD

[75] Inventor: Andrew D. Dubner, St. Paul, Minn.

[73] Assignee: Imation Corp., St. Paul, Minn.

[21] Appl. No.: 413,781

[22] Filed: Mar. 30, 1995

[51] Int. Cl.[6] .................................. G11B 5/66; G11B 9/00
[52] U.S. Cl. .......................................................... 346/74.4
[58] Field of Search ..................... 346/74.2, 74.3, 346/74.4; 369/13, 275.1; 428/64.3, 65.3, 336, 694 ML, 694 MT, 694 RE, 694 NF, 694 RL, 694 MM, 900, 332; 360/114, 133, 135

[56] References Cited

U.S. PATENT DOCUMENTS

| | | | |
|---|---|---|---|
| 4,734,708 | 3/1988 | Saitoh et al. | 346/74.4 |
| 5,018,119 | 5/1991 | Aratani et al. | 369/13 |
| 5,414,678 | 5/1995 | Challenger, IV | 369/13 |
| 5,536,570 | 7/1996 | Osato | 428/336 |
| 5,620,792 | 4/1997 | Challener, IV | 428/332 |

OTHER PUBLICATIONS

"Multilayered Magneto–Optical Disks for Magnetically Induced Superresolution," Kaneko et al., *Jpn. J. Appl. Phys.*, vol. 31 (1992), pp. 568–575.

*Primary Examiner*—N. Le
*Assistant Examiner*—L. Anderson
*Attorney, Agent, or Firm*—Eric D. Levinson

[57] ABSTRACT

A magneto-optic (MO) recording medium having three MO layers having a combined thickness of about 60–100 nm and having a reflectivity of 18–24%. Two dielectric layers are provided between a substrate and the MO layers. The index of refraction (n) of the dielectric layer nearer the substrate is greater than that of the other dielectric layer. Preferred dielectrics for the two layers include silicon carbide ($n \cong 3$) and silicon nitride ($n \cong 2$).

12 Claims, 1 Drawing Sheet

METHOD OF OPTICALLY TURNING A MAGNETO-OPTIC MEDIUM HAVING IN ORDER A SUBSTRATE TWO DIELECTRIC LAYERS, AND A THICK MAGNETO-OPTIC RECORDING LAYER, AND MEDIUM TURNER BY THAT METHOD

FIELD OF THE INVENTION

This invention relates generally to magneto-optic storage media, and more specifically to such media which comprise a thick stack of magneto-optic film layers.

BACKGROUND OF THE INVENTION

Magneto-optic recording systems comprise an optical read/write beam arrangement and a magnetizable storage medium, usually a disk. Writing is accomplished by a high intensity focused light beam, such as a laser, which alters the magnetization of the medium by heating a localized area of the medium above its Curie temperature and allowing the area to cool under an applied magnetic field. Reading is accomplished by a lower intensity linear-polarized beam which, upon transmission through and/or reflection from the medium, experiences a rotation in polarization through a characteristic angle $\theta$ or $-\theta$ depending on the local magnetization of the medium. Optical detectors may be used to translate the rotation angle into a binary data signal.

Magneto-optic (MO) storage media typically consist of a number of thin film layers applied to a substrate. The magnetizable recording layer is generally composed of an amorphous metal alloy having appropriate Curie temperature and coercivity values for good performance in magneto-optic recording. The magnetizable recording layer may comprise one, two, three, or more individual MO layers.

Many of the elements which are suitable for use in the amorphous recording layer(s) react strongly with oxygen and other elements which might be present in the immediate vicinity of the media. To protect the media from degradation, a transparent dielectric layer, also known as an interfering or protective layer, is usually deposited on one or both sides of the magnetizable amorphous layer(s). To be effective, the dielectric materials must not themselves react with the recording layer or any other layer, must offer chemical and physical resistance to degradation by heat, humidity and corrosive chemicals, and must be transparent at the wavelengths used for reading and writing of data. Such dielectric layers can provide a thermal barrier to increase recording efficiency and can also provide signal enhancement via interference effects to increase the magneto-optic rotation angle.

Presently known dielectrics include silicon oxide ($SiO_y$, y<2), titanium dioxide, silicon dioxide, cerium oxide, aluminum oxide, aluminum nitride, silicon nitride, silicon carbide, and metal or semi-conductor oxynitrides.

The speed at which the medium can be read and the reliability of the resulting data depend upon the magneto-optic properties of the medium. An important property for optimum performance is the readout carrier-to-noise ratio (CNR). The CNR is known to be dependent on rotation angle ($\theta$) and ellipticity ($\epsilon$), as well as the reflectivity (R) of the medium. Commonly, drives for reading/writing MO media are designed to detect a specific ratio of MO ellipticity ($\epsilon$) to rotation ($\theta$). This ratio can be specified in terms of the phase shift, $\phi$, as $\phi = \tan^{-1}(\epsilon/\theta)$.

The thickness of the various layers of the magneto-optic medium, together with the optical properties of the materials used in the medium, affect the performance of the medium. In a conventional magneto-optic medium comprising a magnetic recording layer, two dielectric layers and a reflective layer, R and $\epsilon$ may be controlled independently by adjusting the thicknesses of the two dielectric layers, while $\theta$ remains dependent on the values of R and $\epsilon$. The media sensitivity, or laser power requirement for reading and writing, can be adjusted independently by varying the thickness of the reflective layer. Typically, the reflectivity and phase shift ($\phi$) of the MO media are tuned so that the medium may be read/written in all drives designed for reflectivity in the range from about 18% to 24% and phase shift ($\phi$) equal to 0. In a conventional, i.e., single layer MO film stack, the thicknesses of the two dielectric layers and the MO layer can be adjusted to tune the reflectivity and phase shift ($\phi$).

The never-ending tendency in magneto-optic recording is toward higher storage capacities. However, the amount of information that can be stored on a magneto-optic disc is limited by the degree to which the size of a focused laser beam spot can be decreased. One method of reducing the effective area of the laser beam spot is to take advantage of the fact that when a laser is focused to a spot on a moving medium, the temperature of the medium under the spot will not be uniform. If the medium is comprised of a material having a transition temperature within the range of temperatures generated in the medium under the spot, it is possible to erase data recorded in one portion of the spot while reading information in another portion. More specifically, data is erased from a readout layer in the medium at a higher temperature (i.e., at the trailing edge of the beam spot where the moving medium has been exposed to the beam for the longest time) while subjecting that portion of the medium to an external magnetic field, and data is read from the readout layer at a lower temperature (i.e., at the leading edge of the beam spot where the moving medium is just entering the beam spot). This technique is known as magnetic super resolution (MSR).

Data transfer rate may be increased by eliminating the need for a separate erase pass prior to rewriting the data on a recording medium. This may be accomplished by employing a multi-layer MO stack which responds differently to two levels of write power and allows direct overwriting of data without an erase pass. This technique is known as direct overwrite (DOW).

SUMMARY OF THE INVENTION

Typically, the reflectivity and phase shift ($\phi$) of MO media are tuned so that the media functions properly in all drives designed to accept a reflectivity of 18–24% and a phase shift equal to zero ($\phi=0$). In a conventional MO stack, i.e., having a single MO film less than 40 nm thick, the stack may be tuned by adjusting: (1) the dielectric layer between the substrate and medium, (2) the MO film itself, and (3) the dielectric on the other side of the MO film. The MSR film stacks that have been described in the literature typically have thicknesses in the range from 70 to 100 nm. In that situation, due to the thickness of the MO film layers, neither the MO films nor the dielectric on the side of the MO films opposite the substrate can be used to tune the stack due to the fact that the laser beam cannot effectively pass through the MO layers. This makes it extremely difficult to design media having thick MO layers which have a reflectivity within the desired 18–24% range.

Accordingly, the present invention discloses an MO medium having a thick MO layer while having a reflectivity within the desired 18% to 24% range for any wavelength between 200 and 850 nm. The medium includes a substrate, a first dielectric layer, a second dielectric layer, and at least one or two MO film layers having a combined thickness of at least about 60 nm, and more preferably from about 70 to 100 nm. A third dielectric layer is preferably provided over the MO film layers, and a reflective layer is optionally provided over the third dielectric layer. A protective layer may be provided over the reflective layer.

The first two dielectric layers preferably have different indices of refraction, with the refractive index, $n_1$, of the first layer being greater than the refractive index, $n_2$, of the second layer. The difference between $n_1$ and $n_2$ is preferably between 0.6 and 1.4, and is more preferably about 1. Preferred materials for the two dielectric layers include silicon carbide for the first layer and silicon nitride for the second layer. Preferred thicknesses for the dielectric layers are from about 5 to 25 nm for the first layer, and from about 50 to 85 nm for the second layer.

The medium preferably includes at least three MO layers. Preferred MO materials include Fe, Co, and rare earth metals, such as Tb and Gd.

The present invention also includes an MO recording system comprising the medium described above, a laser, positioned to direct a beam of light toward the medium, and a signal analyzer for receiving light from the laser exiting the medium.

The present invention also includes a method of optically tuning the MO medium. The method includes the steps of providing a substrate; providing a first dielectric layer having a refractive index $n_1$ and a second dielectric layer having a refractive index $n_2$, wherein $n_1 > n_2$; and providing an MO recording layer comprising at least one MO film layer, where the recording layer is at least 70 nm thick. The thicknesses of the two dielectric layers are varied to adjust the reflectivity of the medium to a desired range, e.g., 18–24%, while maintaining the phase shift, ($\phi$), at acceptable levels.

By adjusting the thicknesses of the two dielectric layers, the reflectivity and phase shift ($\phi$) of the film stack can be varied over a large range of values including the values typically used in current media. This is an important feature for film stacks with thick MO layers, such as MSR and DOW media, because typical MSR and DOW media have high reflectivity (e.g., 28%) and a non-zero phase shift (e.g., $\phi = 10°$). By using the two-dielectric layer approach of the present invention, the reflectivity of the medium can be lowered to the desired 18–24% range and ellipticity, $\epsilon$ (and thus the phase shift ($\phi$)), can be reduced to zero.

BRIEF DESCRIPTION OF THE DRAWING

The FIGURE shows a schematic side view of a magneto-optic recording system according to the present invention.

DETAILED DESCRIPTION

Figure 1:
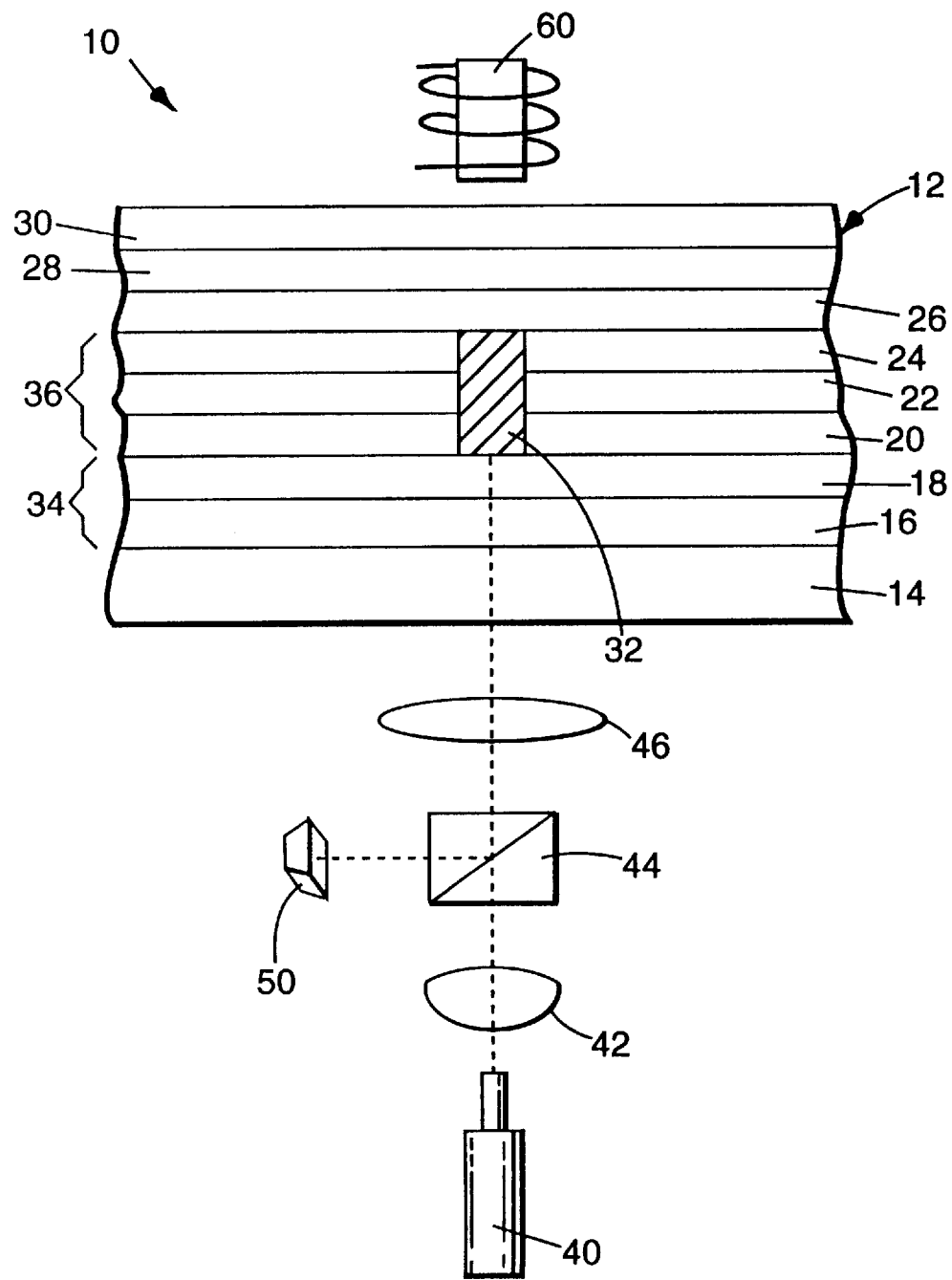

An MO recording system 10 according to the present invention is shown in the FIGURE. System 10 is comprised of MO storage medium 12, laser 40, condensing lens 42, beam splitter 44, objective lens 46, signal analyzer 50, and magnetic field source 60.

As shown in the FIGURE, laser 40 directs a beam of light through condensing lens 42. The beam then passes through beam splitter 44 and is focussed to a point at bit 32, thereby heating the volume of the bit to the write temperature. Magnetic field source 60 provides a magnetic field which orients the magnetic material within bit 32 as it cools, thereby writing the bit.

Laser 40 preferably also operates at a lower energy intensity for reading medium 12. The light from laser 40 is reflected back from medium 12 toward beam splitter 44. Upon reflection from medium 12, the polarization of the light is rotated clockwise or counterclockwise depending on the magnetic orientation of the medium. The light is then reflected by beam splitter 44 toward signal analyzer 50, which determines the direction of polarization rotation and, thus, whether bit 32 has been written or not.

Medium 12 is comprised of the following ordered portions: substrate 14, dielectric portion 34, MO portion 36, dielectric layer 26, optional reflective layer 28, and optional protective layer 30. Substrate 14 is preferably transparent, has very low birefringence, and is nominally 1.2 mm thick. Suitable materials include glass, polycarbonate, polymethylmethacrylate, and amorphous polyolefin (APO).

Dielectric portion 34 is comprised of first dielectric layer 16 (adjacent substrate 14) and second dielectric layer 18. First dielectric layer 16 preferably has a high index of refraction, $n_1$, preferably in the range from about 2.8 to 3.2. Second dielectric layer 18 preferably has a lower index of refraction, $n_2$, preferably in the range from about 1.8 to 2.2. Thus, the difference between $n_1$ and $n_2$ is in the range from about 0.6 to 1.4, and is preferably about 1.

First dielectric layer 16 preferably has a thickness within the range from 5 to 25 nm, and more preferably within the range from 10 to 20 nm. Second dielectric layer 18 preferably has a thickness within the range from 50 to 85 nm, and more preferably from 55 to 75 nm.

Preferred materials for first dielectric layer 16 include silicon carbide having an index of refraction of about 3. Other materials having an index of refraction between 2.8 and 3.2 and which are transparent to the wavelength of interest may be used so long as they are compatible with MO layers, e.g., free of pinholes, chemically inert, processable, etc. Preferred materials for second dielectric layer 18 include silicon nitride having an index of refraction of about 2. Other similarly transparent materials having an index of refraction between 1.8 and 2.2 may be used so long as they are compatible with MO layers, as discussed above.

MO portion 36 is comprised of at least one MO film layer. Although three MO film layers (20, 22, and 24) are shown in the FIGURE, additional MO film layers may be used. MO film layers 20, 22, and 24 preferably have a combined thickness of at least about 60 nm, and preferably less than about 100 nm. Preferred materials for MO film layers 20, 22, and 24 include rare-earth transition metal alloys, such as terbium-iron-cobalt (TbFeCo) and gadolinium-iron-cobalt (GdFeCo). The Curie temperature of MO film layers 20, 22, and 24 can be varied by changing the amount of cobalt present in the alloy.

Dielectric layer 26 may comprise materials such as SiN, silicon oxide ($SiO_x$), yttrium oxide ($YO_x$), aluminum nitride (AlN), silicon aluminum oxynitride (SiAlON), or similar materials having an index of refraction of about 2. Dielectric layer 26 preferably has a thickness in the range from 10 to 150 nm.

Optional reflecting layer 28 typically comprises a highly reflective metal such as aluminum, gold, silver, or some alloy thereof Reflecting layer 28 typically ranges from about 20 to 200 nm thick. Optional protective layer 30 is deposited on reflecting layer 28 to additionally protect the thin film materials in the MO layers from reacting with elements in the surrounding environment. Protective layer 30 preferably comprises a photocurable polymer with a thickness of greater than 3 $\mu$m.

The reflectivity R and phase shift $\phi$ of medium 12 are each dependent on the thicknesses of first dielectric layer 16 and second dielectric layer 18. When both layers are included, the reflectivity is more sensitive to the thickness of second dielectric layer 18 than to the thickness of first dielectric layer 16. Conversely, the phase shift is more sensitive to the thickness of first dielectric layer 16 than to the thickness of second dielectric layer 18. While the thickness of the second dielectric layer 18 can be varied to obtain a range of reflectivities, e.g., 28–32%, the reflectivity of medium 12 can be shifted lower by changing the thickness of the first dielectric layer 16, e.g., down to 18–22%.

The recording medium may be optically tuned by an iterative process of adjusting both dielectric layers (16 and 18) to bring the reflectively into the desired range and to make the phase shift equal to about zero. This may be done by increasing the thickness of first dielectric layer 16, e.g., about 15 nm, and adjusting the reflectivity of the medium by adjusting the thickness of second dielectric layer 18 to bring the reflectivity into the desired range. The thickness of first dielectric layer 16 can be adjusted to lower the phase shift, which will also adjust the resultant reflectivity, and second dielectric layer 18 can be readjusted to give the desired reflectivity.

The invention will now be further described by reference to the following non-limiting example. (All measurements approximate.)

EXAMPLE

Several film stacks were fabricated having two dielectric layers between the substrate and MO layers according to the present invention. The material used for first dielectric layer 16 was SiC having an index of refraction of about 3. Second dielectric layer 18 was SiN having an index of refraction of about 2.

The dielectric layer(s) were deposited on a glass substrate and the following layers were deposited in order:

first MO film 20: $Gd_{0.215}Fe_{0.705}Co_{0.080}$, 30 nm thick
second MO film 22: $Tb_{0.120}Fe_{0.880}Co_{<0.005}$, 10 nm thick
third MO film 24: $Tb_{0.197}Fe_{0.719}Co_{0.084}$, 40 nm thick
dielectric layer 26: SiN, 10 nm thick
reflective layer 28: $AlCr_{0.04}$, 30 nm thick.

The optical properties of samples 1–10 were measured at 830 nm as shown the Table below.

TABLE

| Sample No. | Thickness of SiC in nm | Thickness of SiN in nm | Refl. (%) | Rotation θ(degrees) | Ellipticity ε(degrees) | Phase Shift φ (degrees) |
|---|---|---|---|---|---|---|
| 1 | — | 80 | 29.0 | -0.773 | -0.181 | 13.2 |
| 2 | — | 87 | 28.6 | -0.784 | -0.147 | 10.6 |
| 3 | — | 100 | 29.9 | -0.773 | -0.079 | 5.8 |
| 4 | — | 100 | 29.4 | -0.780 | -0.104 | 7.6 |
| 5 | 10 | 84 | 27.8 | -0.750 | +.007 | -0.5 |
| 6 | 10 | 84 | 27.9 | -0.749 | +0.002 | -0.2 |
| 7 | 12 | 74 | 25.0 | -0.767 | +0.028 | -2.1 |
| 8 | 15 | 58 | 19.8 | -0.904 | -0.065 | 4.1 |
| 9 | 17 | 62 | 21.3 | -0.842 | +0.041 | -2.8 |
| 10 | 17 | 76 | 29.0 | -0.679 | +0.103 | -8.6 |

In samples 1–4, no silicon carbide layer was provided. As indicated in the Table, the samples were characterized by a reflectivity that was too high (e.g., over 28%). The phase shift φ was also too high (e.g., over 5°).

In samples 9–10, the thickness of the silicon carbide layer was held constant at 17 nm while the thickness of the silicon nitride was varied. The Table indicates that varying the thickness of the silicon nitride varied the reflectivity and phase shift φ of the stack.

In samples 5–8, the thicknesses of both dielectric layers were varied. The results in the Table indicate that varying both layers simultaneously allows for the selection of a desired amount of reflectivity while minimizing φ, which is desired.

I claim:

1. A magneto-optic recording medium, comprising, in order:
   a substrate;
   a first dielectric layer comprising silicon carbide;
   a second dielectric layer adjacent the first dielectric layer and comprising silicon nitride;
   three magneto-optic film layers adjacent each other having a combined thickness of at least 60 nm, wherein the layers comprise Fe, Co, and a rare earth metal;
   a third dielectric layer; and
   a reflective layer.

2. The medium of claim 1, wherein the first dielectric layer has a thickness within the range from 5 to 25 nm and the second dielectric layer has a thickness within the range from 50 to 85 nm.

3. A magneto-optic recording system, comprising:
   a magneto-optic recording medium, comprising, in order:
      a substrate;
      a first dielectric layer comprising silicon carbide;
      a second dielectric layer adjacent the first dielectric layer and comprising silicon nitride; and
      a magneto-optic recording layer comprising at least three magneto-optic film layers adjacent each other, the recording layer having a thickness of at least about 60 nm;
   a laser positioned to direct a beam of light toward the magneto-optic recording medium; and
   a signal analyzer for receiving light from the laser exiting the medium.

4. The system of claim 3, wherein the medium further comprises a third dielectric layer provided over the magneto-optic recording layer, and a reflective layer provided over the third dielectric layer.

5. The system of claim 3, wherein the first dielectric layer has a thickness within the range from 5 to 25 nm and the second dielectric layer has a thickness within the range from 50 to 85 nm.

6. A method of optically tuning a magneto-optic recording medium, the medium comprising, in order: a substrate, a first dielectric layer, a second dielectric layer adjacent the first dielectric layer, and a magneto-optic recording layer, the method comprising the steps of:
   selecting a first material having a first thickness $t_1$ and a first index of refraction $n_1$ for use as the first dielectric layer;
   selecting a second material having a second thickness $t_2$ and a second index of refraction $n_2$ for use as the second dielectric layer, wherein $n_1 < n_2$;
   selecting the magneto-optic recording layer at a thickness of at least 60 nm; and
   optically tuning the medium at a given wavelength λ by varying the values of $t_1$ and $t_2$ to adjust reflectivity R of the medium to a desired range while minimizing phase shift φ of the medium.

7. The method of claim 6, further comprising the steps of:
   providing a third dielectric layer over the magneto-optic recording layer; and
   providing a reflective layer over the third dielectric layer.

8. The method of claim 6, wherein $0.6 < n_1 - n_2 < 1.4$.

9. The method of claim 6, wherein $n_1 - n_2 \cong 1$.

10. The method of claim 6, wherein the first dielectric layer comprises silicon carbide and the second dielectric layer comprises silicon nitride.

11. The method of claim 6, wherein the first dielectric layer has a thickness within the range from 5 to 25 nm and the second dielectric layer has a thickness within the range from 50 to 85 nm.

12. The method of claim 6, wherein $2.8 \leq n_1 \leq 3.2$ and $1.8 \leq n_2 \leq 2.2$.

* * * * *